US012202167B2

(12) United States Patent
Kovács et al.

(10) Patent No.: US 12,202,167 B2
(45) Date of Patent: Jan. 21, 2025

(54) STOP UNIT AND BENCH SAW

(71) Applicant: Festool GmbH, Wendlingen (DE)

(72) Inventors: Ondrej Kovács, Ceská Lípa (CZ); Václav Zvánovec, Mimon (CZ)

(73) Assignee: Festool GmbH, Wendlingen (DE)

( * ) Notice: Subject to any disclaimer, the term of this patent is extended or adjusted under 35 U.S.C. 154(b) by 213 days.

(21) Appl. No.: 17/422,592

(22) PCT Filed: Jan. 9, 2020

(86) PCT No.: PCT/EP2020/050383
§ 371 (c)(1),
(2) Date: Jul. 13, 2021

(87) PCT Pub. No.: WO2020/148148
PCT Pub. Date: Jul. 23, 2020

(65) Prior Publication Data

US 2021/0387374 A1 Dec. 16, 2021

(30) Foreign Application Priority Data

Jan. 14, 2019 (DE) ......................... 102019200366.4

(51) Int. Cl.
*B27G 19/02* (2006.01)
*B27B 25/10* (2006.01)
(Continued)

(52) U.S. Cl.
CPC .............. *B27G 19/02* (2013.01); *B27B 25/10* (2013.01); *B27B 27/04* (2013.01); *B27B 5/243* (2013.01)

(58) Field of Classification Search
CPC ........... B27B 5/38; B27B 27/02; B27B 27/04; B27G 19/02; F16P 3/00–24
(Continued)

(56) References Cited

U.S. PATENT DOCUMENTS 1,397,606 A 11/1921 Smith
1,888,679 A 11/1932 Knapp
(Continued)

FOREIGN PATENT DOCUMENTS

CN 101801622 8/2010
CN 102099142 6/2011
(Continued)

OTHER PUBLICATIONS

JPS5657723U English translation; May 1981 B23D47/04.*
(Continued)

*Primary Examiner* — Laura M Lee
(74) *Attorney, Agent, or Firm* — HSML P.C.

(57) ABSTRACT

A stop unit, in particular to an angle stop, for guiding and/or for the feed of a workpiece to a saw blade of a bench saw, including a stop arm which extends in a longitudinal direction for the contact of the workpiece. The stop arm includes a main section which is manufactured from a first material and which extends over more than half the longitudinal extension of the stop arm, and at least one second end section which is arranged on an end of the main section which is located in the longitudinal direction. The second section is able to come into contact with the saw blade given an advance of the workpiece towards the saw blade, where the at least one end section is manufactured from a second material.

19 Claims, 6 Drawing Sheets

(51) Int. Cl.
*B27B 27/04* (2006.01)
*B27B 5/24* (2006.01)

(58) Field of Classification Search
USPC .............................................................. 83/62
See application file for complete search history.

(56) References Cited

U.S. PATENT DOCUMENTS

| | | | | | |
|---|---|---|---|---|---|
| 2,603,252 | A | | 7/1952 | Petersen | |
| 2,968,325 | A | * | 1/1961 | Wandvik | B27B 25/10 83/522.18 |
| 2,980,152 | A | | 4/1961 | Slavin | |
| 3,043,353 | A | | 7/1962 | Sherwen et al. | |
| 3,060,979 | A | | 10/1962 | Hanvin | |
| 3,128,801 | A | | 8/1964 | Brede | |
| 3,222,970 | A | | 12/1965 | Hill | |
| 3,285,303 | A | | 11/1966 | Kwiatkowski | |
| 3,905,263 | A | | 9/1975 | Smith | |
| 3,955,457 | A | | 5/1976 | Mendelson | |
| 4,483,573 | A | | 11/1984 | Keller | |
| 4,502,518 | A | | 3/1985 | Lewin | |
| 5,038,486 | A | * | 8/1991 | Ducate, Sr. | B27B 29/00 83/435.14 |
| 5,042,346 | A | | 8/1991 | McCann | |
| 5,379,669 | A | * | 1/1995 | Roedig | B23Q 3/007 83/435.14 |
| 5,797,307 | A | | 8/1998 | Horton | |
| 5,894,776 | A | | 4/1999 | Bartz | |
| 5,970,835 | A | | 10/1999 | Kenyon et al. | |
| 6,095,024 | A | * | 8/2000 | Brutscher | B23D 45/105 83/437.2 |
| 6,237,457 | B1 | * | 5/2001 | Taylor | B23D 47/02 83/435.11 |
| 6,293,177 | B1 | * | 9/2001 | MacKenzie | B23Q 3/007 83/522.19 |
| 6,481,477 | B1 | * | 11/2002 | Szymanski | B27C 5/04 144/135.2 |
| 6,499,224 | B1 | * | 12/2002 | Asick | B23B 47/287 83/438 |
| 6,736,044 | B2 | | 5/2004 | Chang | |
| 6,796,208 | B1 | | 9/2004 | Jorgensen | |
| 7,077,179 | B1 | | 7/2006 | Camiano et al. | |
| 7,127,976 | B1 | * | 10/2006 | Fitzsimmons | B23D 55/046 83/437.1 |
| 7,240,706 | B2 | * | 7/2007 | Liu | B23D 47/025 144/287 |
| 7,827,890 | B2 | | 11/2010 | Gass et al. | |
| 7,930,959 | B1 | | 4/2011 | Greene | |
| 8,127,648 | B2 | | 3/2012 | Arvey | |
| 8,967,027 | B2 | * | 3/2015 | Koegel | B23D 47/025 144/287 |
| 9,505,069 | B2 | * | 11/2016 | Frolov | B23D 47/025 |
| 9,919,369 | B2 | | 3/2018 | Gass et al. | |
| 9,975,269 | B2 | | 5/2018 | Koegel | |
| 10,076,796 | B2 | | 9/2018 | Chung | |
| 10,549,364 | B2 | | 2/2020 | Frolov | |
| 10,792,834 | B2 | | 10/2020 | Garees et al. | |
| 11,305,394 | B2 | | 4/2022 | Chike | |
| 2002/0017336 | A1 | | 2/2002 | Gass et al. | |
| 2002/0056350 | A1 | | 5/2002 | Gass et al. | |
| 2004/0003696 | A1 | * | 1/2004 | Radda | B27B 27/08 83/437.1 |
| 2004/0060407 | A1 | | 4/2004 | Kao | |
| 2004/0134324 | A1 | | 7/2004 | Sheddy et al. | |
| 2005/0223862 | A1 | * | 10/2005 | Oberheim | B23D 47/025 83/477.2 |
| 2006/0053993 | A1 | | 3/2006 | Wong | |
| 2007/0186741 | A1 | | 8/2007 | Buck et al. | |
| 2009/0084240 | A1 | | 4/2009 | Gass et al. | |
| 2009/0229437 | A1 | | 9/2009 | Tanaka | |
| 2009/0314148 | A1 | | 12/2009 | Gass | |
| 2010/0037740 | A1 | | 2/2010 | Lin | |
| 2010/0263511 | A1 | | 10/2010 | Firth | |
| 2010/0269657 | A1 | * | 10/2010 | Koegel | B27B 5/243 83/444 |
| 2011/0061506 | A1 | | 3/2011 | Frolov | |
| 2011/0115143 | A1 | * | 5/2011 | Thompson, Jr. | B27B 27/02 269/8 |
| 2011/0146468 | A1 | | 6/2011 | Fuchs | |
| 2011/0296968 | A1 | * | 12/2011 | Doumani | B23D 59/005 83/468.2 |
| 2011/0314986 | A1 | | 12/2011 | Doumani et al. | |
| 2012/0036976 | A1 | | 2/2012 | Frolov | |
| 2012/0090439 | A1 | | 4/2012 | Butler | |
| 2014/0311310 | A1 | | 10/2014 | Koegel | |
| 2015/0020668 | A1 | | 1/2015 | Gass et al. | |
| 2016/0263768 | A1 | * | 9/2016 | DeCicco | B23D 47/08 |
| 2016/0271826 | A1 | * | 9/2016 | Bow | B27B 29/00 |
| 2017/0252841 | A1 | | 9/2017 | Wang et al. | |
| 2018/0257255 | A1 | | 9/2018 | Niichel | |
| 2023/0074608 | A1 | | 3/2023 | Chen et al. | |

FOREIGN PATENT DOCUMENTS

| | | | | | |
|---|---|---|---|---|---|
| CN | 102335787 | | | 2/2012 | |
| CN | 103108718 | | | 5/2013 | |
| CN | 107708946 | | | 2/2018 | |
| DE | 1803537 | | | 6/1970 | |
| DE | 2910095 | | | 9/1980 | |
| DE | 19529705 | | | 2/1997 | |
| DE | 29718913 | | | 2/1999 | |
| DE | 203 13 886 | U | | 11/2003 | |
| DE | 102006055018 | | | 10/2007 | |
| DE | 20 2019 107 145 | U | | 3/2021 | |
| EP | 1 258 305 | | | 11/2002 | |
| EP | 3424656 | | | 1/2019 | |
| FR | 1 376 578 | | | 10/1964 | |
| FR | 2 451 254 | | | 10/1980 | |
| FR | 2773096 | | | 7/1999 | |
| JP | 49-81290 | U | | 7/1974 | |
| JP | 56-57723 | U | | 5/1981 | |
| JP | S5657723 | U | * | 5/1981 | B23D 47/04 |
| JP | 5-031701 | | | 2/1993 | |
| JP | 2009-241248 | | | 10/2009 | |
| JP | 2010-042474 | | | 2/2010 | |
| JP | 2012-086412 | | | 5/2012 | |
| JP | 2012086412 | A | * | 5/2012 | B27B 27/10 |
| JP | 2018-001300 | | | 1/2018 | |
| TW | 201311389 | | | 3/2013 | |
| WO | 2009/090359 | | | 7/2009 | |
| WO | 2009/115883 | | | 9/2009 | |
| WO | 2016/089973 | | | 6/2016 | |

OTHER PUBLICATIONS

JP2012086412A English translation; May 10, 2012 Ikeda M; B27B27/10.*

JPS5657723-U English translation; May 18, 1981; B23D47/04.*

Second Office Action issued in Chinese Patent Application No. 2020800091818, Oct. 26, 2022, 20 pages w/translation.

International Search Report and Written Opinion, issued in the corresponding PCT application No. PCT/EP2020/050383, dated Jul. 10, 2020, 22 pages.

German Search Report, issued in the corresponding German application No. 10 2019 200 366.4, dated Aug. 7-12, 2012, 2019, 8 pages.

International Search Report and Written Opinion, issued in the related PCT application No. PCT/EP2020/050384, dated May 6, 2020, 11 pages.

International Search Report and Written Opinion, issued in the related PCT application No. PCT/EP2020/050380, dated May 6, 2020, 12 pages.

Office Action issued in Chinese Patent Application No. 202080009180.3, Feb. 14, 2022, 7 pages.

Office Action issued in Chinese Patent Application No. 202080009181.8, Mar. 11, 2022, 7 pages.

Office Action issued in parallel Japanese Patent Application No. 2021-538302, Jun. 29, 2022, 5 pages w/translation.

(56) References Cited

OTHER PUBLICATIONS

Office Action issued in parallel Japanese Patent Application No. 2021-538303, Jun. 29, 2022, 8 pages w/translation.
Office Action issued in parallel Japanese Patent Application No. 2021-538304, Jul. 6, 2022, 9 pages w/translation.
Office Action issued in European Patent Application No. 20700462.3, Aug. 18, 2023, 6 pages.
Second Office Action issued in Japanese Patent Application No. 2021-538304, Apr. 10, 2023, 11 pages w/translation.
Office Action issued Japanese Patent Application No. 2021-538304, Jan. 4, 2024, 12 pages w/translation.

* cited by examiner

STOP UNIT AND BENCH SAW

The invention relates to a bench saw as well as to a stop unit for the bench saw. The present invention in particular is concerned with the task of reducing the probability of operational interruptions and/or increasing the operational safety.

BACKGROUND OF THE INVENTION

The invention relates to a stop unit, in particular to an angle stop, for guiding and/or for the feed of a workpiece to a saw blade of a bench saw. The stop unit comprises a stop arm which extends in the longitudinal direction, for the contact of the workpiece. The stop arm comprises a main section which is manufactured from a first material and which extends over more than half the longitudinal extension of the stop arm. The stop arm further comprises at least one second end section which is arranged on an end of the main section which is located in the longitudinal direction. The second end section can come into contact with the saw blade given a feed of the workpiece towards the saw blade.

SUMMARY OF THE INVENTION

An object of the invention is to modify the stop unit such that the probability of operational disturbances can be reduced.

The object is achieved by a stop unit according to claim 1. Concerning this stop unit, the at least one end section is manufactured of a second material.

Given the feed of the workpiece with the stop unit, it can occur that the end section comes into contact with the saw blade. Conventional stop units as a rule comprise a single-piece stop arm of metal. If the saw blade comes into contact with a metallic end section of such a conventional stop arm, then (inasmuch as the bench saw has a certain safety function) it can occur that the saw blade is stopped and/or is brought into a safety position. The operation of the bench saw is interrupted by way of this. Furthermore, damage to the stop arm can occur, so that the complete stop arm must be exchanged due to the single-piece design.

On account of the fact that with regard to the present stop unit, the end section is manufactured of a different material than the main section, the material of the end section (in particular independently of the material of the main section) can be selected such that a safety function which is possibly present with the bench saw cannot be activated by way of the contact of the saw blade with the end section. Furthermore, the material of the end section can be selected such that the end section can be provided as an inexpensive wearing part. The main section can simultaneously be manufactured of a stable, durable material, such as for example metal, even if this material would activate the safety function given a contact of the saw blade with the main section.

The features which are mentioned with regard to the stop unit "first material" and "second material" are different features than the features "first material" and "second material" which are mentioned above with regard to the saw blade cover. The feature "first material" which is mentioned with regard to the stop unit can also is denoted as a "third material" or as a "main section material" and the "second material" which is mentioned with regard to the stop unit can also be denoted as a "fourth material" or as an "end section material".

The second material which is mentioned with regard to the stop unit differs from the first material which is mentioned with regard to the stop unit. In particular, the second material has a different conductivity than the first material, expediently a lower conductivity. By way of example, the first material is metal and/or the second material is plastic.

The at least one end section is expediently attached to the main section in a removable manner. By way of example, the at least one end section is stuck into and/or onto a face side of the main section. Expediently, the main section is an extruded profile and/or the end section is a plastic cap.

The invention further relates to a bench saw with a stop unit which is described above, with lay-on section for laying on the workpiece, as well as with the saw blade. The bench saw is expediently designed to carry out a safety function, in particular for stopping the saw blade and/or for bringing the saw blade into a safety position, on the basis of an electrical characteristic, in particular an electrical conductivity, of an object which is in contact with the saw blade. The electrical characteristic, in particular the electrical conductivity of the second material is preferably of a nature such that the bench saw does not carry out the safety function given a contact of the saw blade with the end section.

Expediently, the safety function is not activated by way of the contact of the saw blade with the workpiece and is activated given a contact of the saw blade with the human body.

The invention further relates to a bench saw comprising a saw blade and a support structure with a lay-on surface for laying on the workpiece on machining the workpiece with the saw blade. The bench saw comprises a stop unit, in particular a stop unit which is described above, for guiding and/or for the feed of the workpiece to the saw blade. The stop unit comprises a bearing section which is engaged with a guide element of the bench saw, in order to thus provide a movable mounting of the stop unit relative to the support structure along the guide element. The guide element is arranged offset to the bottom relative to the lay-on surface.

According to a preferred design, the bearing section comprises rollers, via which the bearing section is movably mounted relative to the support section. Expediently, two of the rollers are aligned to one another in different spatial directions.

The invention further relates to a saw blade cover. In particular, the saw blade cover is designed as a saw blade hood and comprises a cover body which extends in a longitudinal direction and which is manufactured of a first material, for the at least partial covering of a saw blade of the bench saw. The saw blade cover further comprises a contact region which is arranged on the cover body at the face side. The contact region is bevelled relative to the longitudinal direction, so that a deflection of the cover body can be effected by way of contact of the contact region with a workpiece which is brought onto the saw blade.

An object of the invention is to modify the saw blade cover such that the probability of operational disturbances can be reduced.

The object is achieved by a saw blade cover, concerning which the contact region comprises a sliding section which is manufactured of a second material and along which the workpiece can slide on contact with the contact region.

In particular, if the workpiece consists of a hard material and/or comprises a sharp edge at its side which is to be fed to the saw blade, concerning conventional saw blade covers it can occur that the workpiece cuts into the material of the contact region on contact with the contact region and consequently gets caught on the contact region. It can then occur that the saw blade cover is not deflected, so that the cutting region of the saw blade is not uncovered. As a result, the workpiece cannot be brought onto the cutting region of the saw blade—and a disturbance of the operation of the bench saw occurs.

On account of the provision of the saw blade cover with the sliding section, the probability of this operational disturbance can be expediently reduced. In particular, by way of the sliding section, one can prevent a workpiece from cutting into the contact region on contact with this and getting caught on the contact region. As a result, the probability of operational disturbances can be reduced.

The first material can also be denoted as a cover body material and the second material can also be denoted as a sliding section material. The second material differs from the first material. Expediently, the second material has a greater hardness than the first material. The first material in particular is of plastic and/or the second material in particular is of metal, preferably aluminium.

The sliding section is expediently strip-like. The sliding section is preferably designed as an aluminium tape. According to a preferred design, the contact region and the sliding section are elongate. Expediently, the sliding section runs in the longitudinal direction of the contact region.

The contact region is expediently a face-side contact surface. The sliding section is expediently only present in a part-region, in particular a part-region which is central in the horizontal direction, of the face-side contact surface.

According to an alternatively design, the complete contact region, in particular the complete contact surface is manufactured of the second material.

Alternatively or additionally, furthermore a saw blade cover is provided, whose cover body as a whole is manufactured of metal, in particular aluminium.

The invention further relates to a bench saw with a saw blade cover which is described above, a lay-on section for the laying-on of a workpiece, as well as the saw blade.

According to a preferred design, the cover body in a covering position at least partly covers the saw blade. The cover body is movably mounted relative to the saw blade, so that by way of impinging the contact region with the workpiece which moves on the lay-on section in the direction of the saw blade, the cover body can be brought into an uncovering position, in which the saw blade is uncovered further than in the covering position. In particular, the cutting region of the saw blade is uncovered in the uncovering position. It is that region of the saw blade, with which the machining of the workpiece takes place given the designated use of the bench saw which is denoted as the cutting region.

The invention further relates to a bench saw, comprising a support structure with a lay-on section which provides a lay-on surface for the laying-on of a workpiece, as well as a saw blade which engages through an opening of the lay-on section, so that at least a part of the saw blade is located below the lay-on section lower side. The bench saw further comprises a housing arrangement which is located below the lay-on section lower side and which surrounds the part of the saw blade which is located below the lay-on section lower side. The saw blade is pivotable together with the housing arrangement relative to the lay-on section, in order to adjust an angle between a cutting plane of the saw blade and the lay-on surface.

An object of the invention lies in increasing the operational safety.

The object is achieved by a bench saw which comprises a cover flap which covers a gap between the housing arrangement and the lay-on section lower side, said gap arising on pivoting the housing arrangement, in order to prevent a user of the bench saw from being able to grip through the gap to the saw blade. In this manner, the operational safety of the bench saw is increased.

Expediently, the cover flap is mounted, in particular in a movable manner, on the housing arrangement and/or the support structure. The cover flap is preferably movably mounted on the housing arrangement and/or is fixedly mounted on the support structure.

By way of example, the cover flap can be brought from a first position into a second position by way of pivoting the housing arrangement. The cover flap in the first position is aligned parallel to the lay-on section lower side and/or in the second position is aligned in a manner inclined to the lay-on section lower side about a horizontal axis.

Expediently, the support structure comprises several stand legs, via which the lay-on section can be supported with respect to the floor. Free regions, through which a user can grip below the lay-on section lower side, are present between the stand legs. The bench saw, in particular the support structure is thus non-encapsulated to a certain extent and permits a user to grip below the lay-on section in a simple manner.

BRIEF DESCRIPTION OF THE DRAWINGS

Further exemplary features and embodiments are hereinafter explained with reference to the figures. Herein are shown.

DETAILED DESCRIPTION OF THE INVENTION

Concerning the subsequent description, the spatial directions which are aligned orthogonally to one another and which are denoted as the x-direction, the y-direction and the z-direction are referred to. The z-direction can also be denoted as the height direction and runs vertically. The x-direction and the y-direction are horizontal directions.

Figure 2:
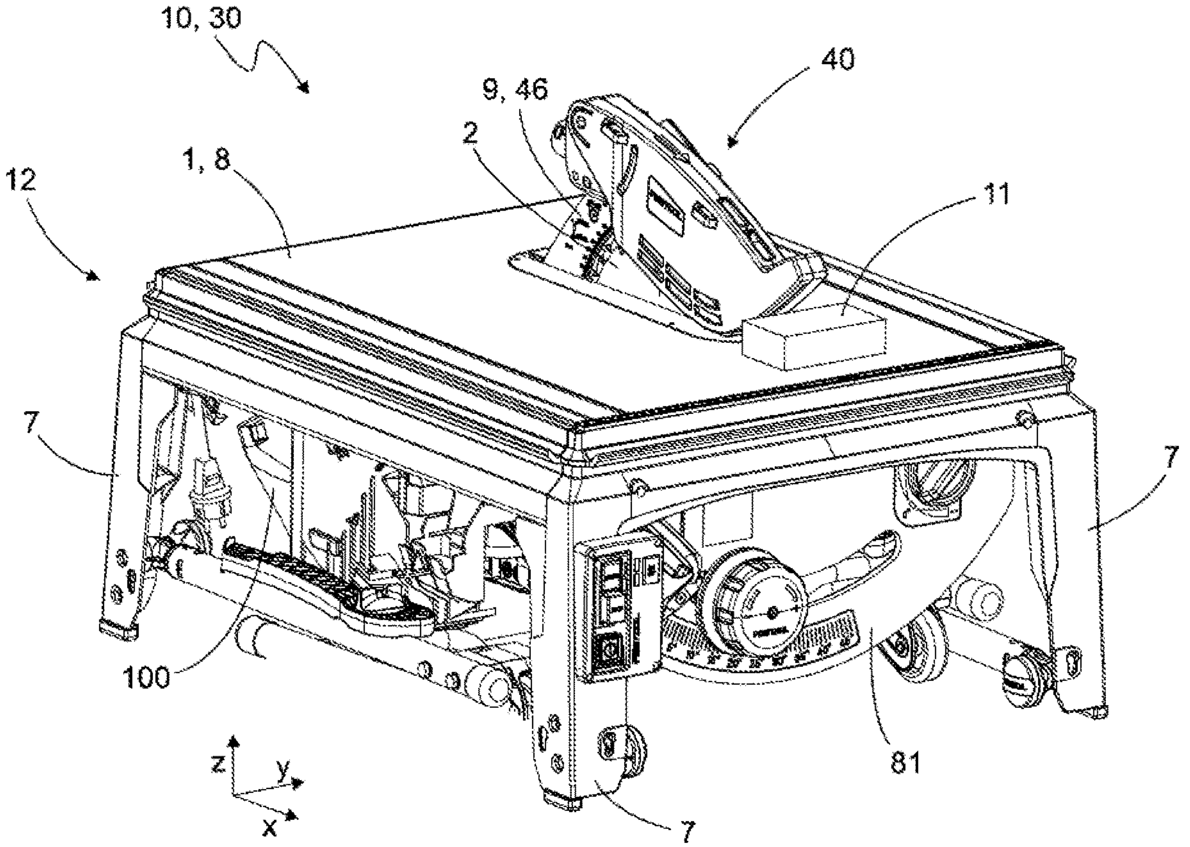
FIG. 2 a bench saw with a saw blade cover.
Figure 6:
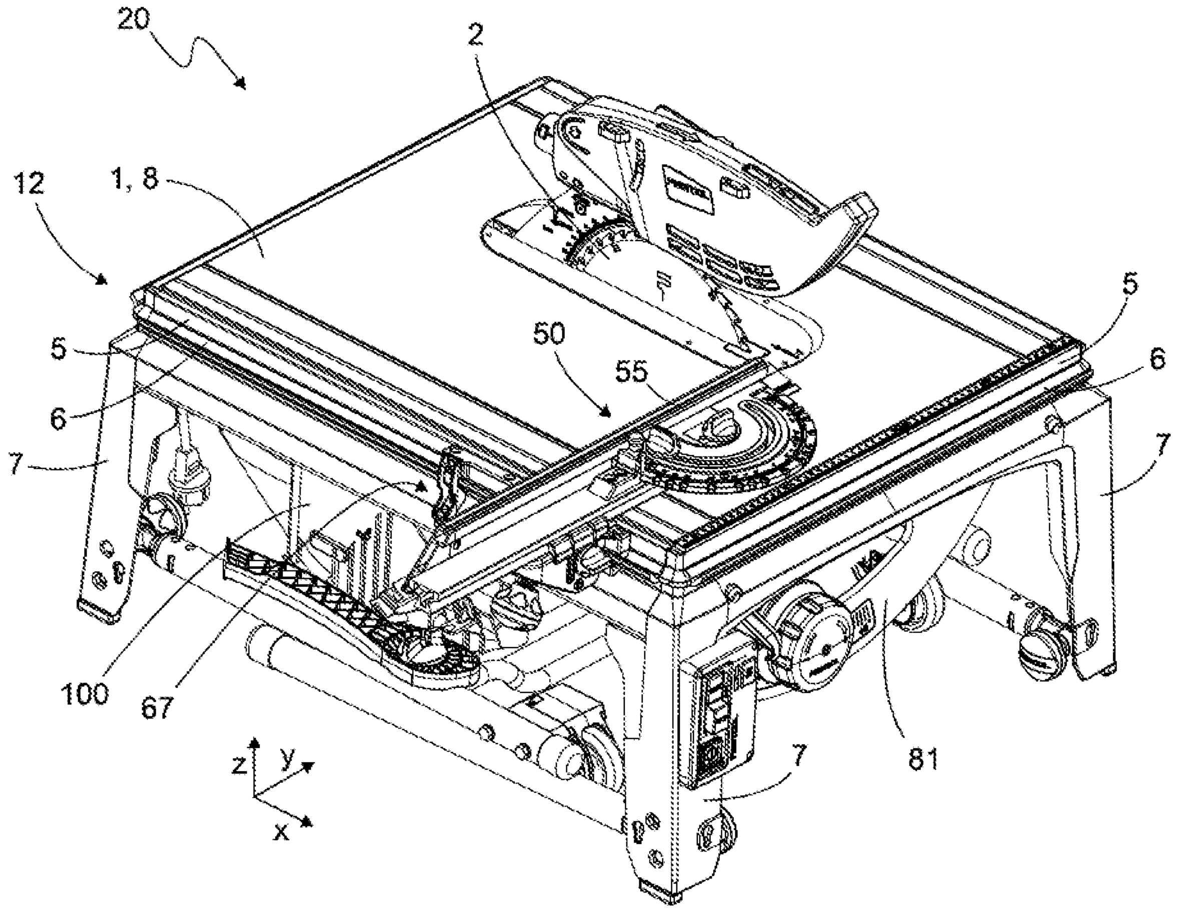

Firstly, the basic construction of the bench saw is to be dealt with. The subsequent explanation expediently applies to all bench saws which are mentioned here, in particular to the bench saws 10, 20, 30 which are shown in FIGS. 2 and 6. Preferably, all the bench saws which are mentioned here are the same bench saw.

The bench saw 10, 20, 30 by way of example is designed as a circular bench saw. In particular, the bench saw 10, 20, 30 is a semi-stationary tool. The bench saw 10, 20, 30 comprises a saw blade 2, in particular a circular saw blade. Expediently, the bench saw 10, 20, 30 comprises a drive unit 86 for the drive, in particular for the rotation drive, of the saw blade 2. The drive unit 86 expediently comprises an electric motor.

The bench saw 10, 20, 30 comprises a support structure 12 which by way of example is designed as a table. The support structure 12 comprises a lay-on section 1, whose lay-on section upper side 8 serves as a lay-on surface 8 for a workpiece 11 which is to be machined with the saw blade 2. The lay-on section 1 by way of example is designed in a plate-like manner, in particular as a bench plate. The lay-on section 1 expediently has a rectangular base surface. The lay-on surface 8 is expediently rectangular. The lay-on surface 8 is aligned normally to the z-direction and is preferably plane.

The support structure 12 further comprises several stand legs 7—by way of example four stand legs 7 which are arranged at the four corner regions of the lay-on section 1—via which the lay-on section 1 is supported with respect to the base. Expediently, free regions which by way of example extend more than three-quarters of the vertical extension of the stand legs 7 are present between the stand legs 7. In particular, no trim, in particular no housing wall is present between two or more stand legs 7. A user can grip through and between two stand legs 7 into the free space which is present below the lay-on section lower side 14.

An opening, by way of example a slot, through which the saw blade 2 engages, is present in the lay-on section 1, in particular the lay-on surface 8. The opening is aligned with its longitudinal extension in the x-direction. A part of the saw blade 2 is located above the lay-on section 1, in particular above the lay-on surface 8, and a further part of the saw blade is located below the lay-on section 1, in particular below the lay-on section lower side 14.

Purely by way of example, the bench saw 10, 20, 30 has a safety function, which is automatically activated given a detected contact between the saw blade 2 and a body part of a person. Expediently, the bench saw 10, 20, 30 is designed, via the provision of an electrical signal to the saw blade 2, to detect an electrical characteristic, in particular electrical conductivity, of an object which is in contact with the saw blade, in order to determine whether the object is a human body part. The bench saw 10, 20, 30 is further designed to carry out the safety function on the basis of the detected electrical conductivity. Concerning the design of the safety function, for example the saw blade 2 is stopped, in particular braked, and/or the saw blade 2 is brought into a safety position, in particular into a safety position, at which the saw blade 2 is located completely below the lay-on surface 8

The manner of functioning of such a detection of a contact of the saw blade 2 with a body part and with a safety function is known e.g. from EP 1 234 285 B1, so that a more detailed description of the manner of functioning is omitted here.

Figure 7:
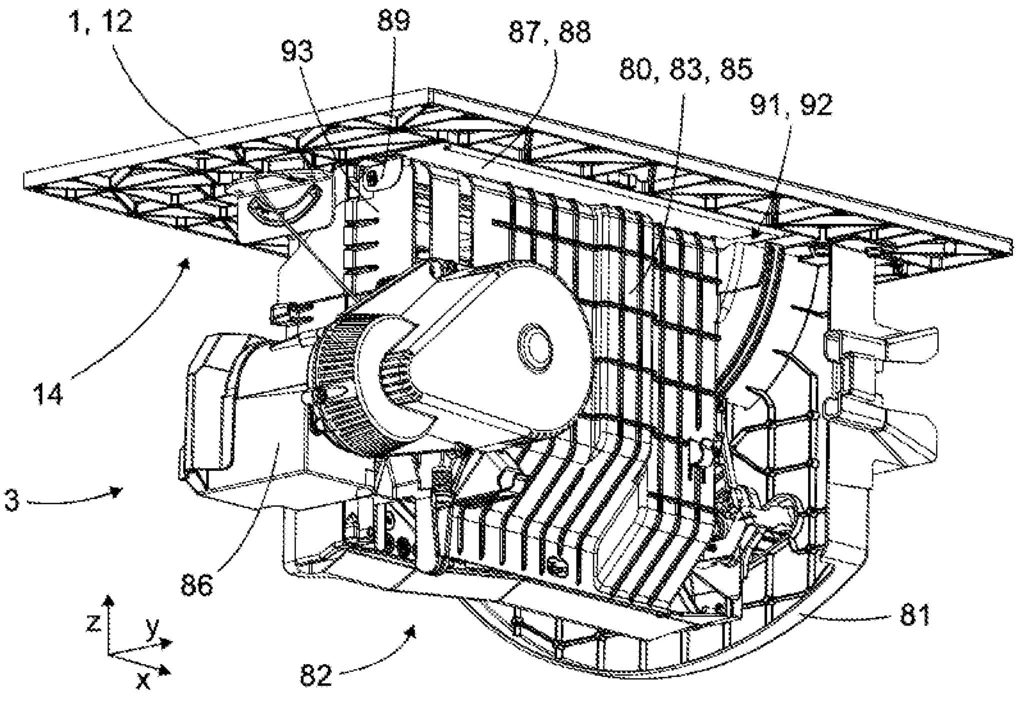
Figure 8:
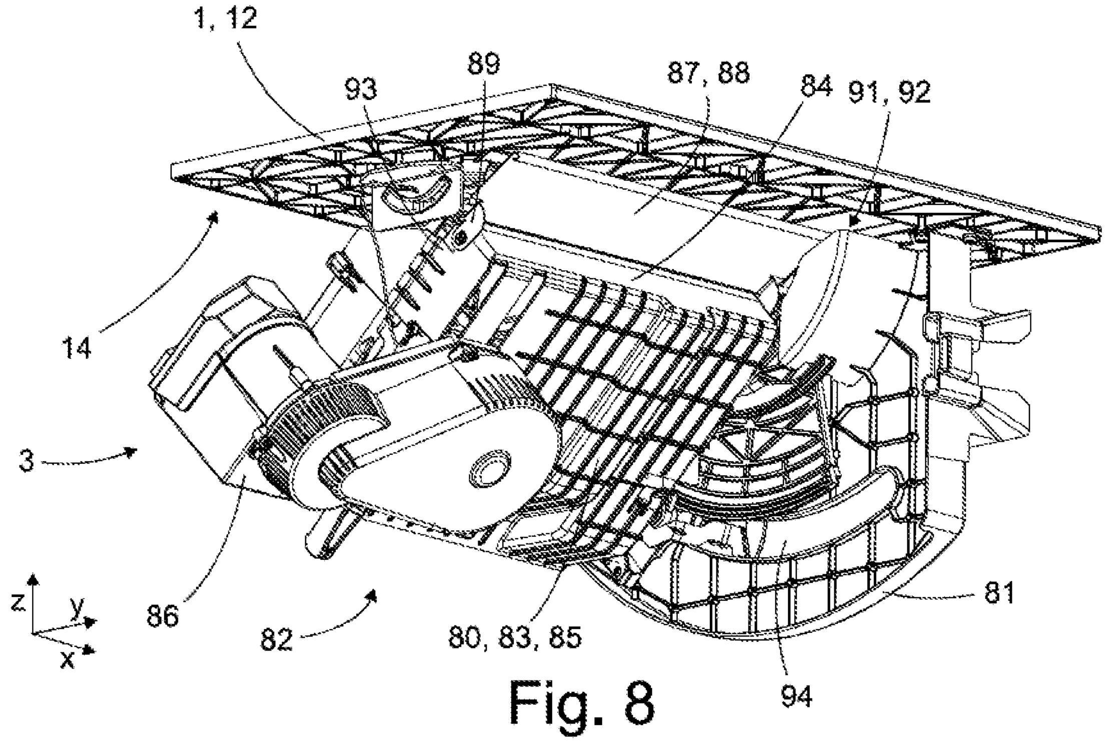

The bench saw 10, 20, 30 by way of example comprises an actuation section 3 which by way of example is shown in the FIGS. 7 and 8. The actuation section 3 is designed to set the position of the saw blade 2 relative to the lay-on surface 8. Expediently, the actuation section 3 is designed to pivot the saw blade 2 relative to the lay-on surface 8 about a pivot axis which runs in the x-direction, about an angle between the cutting plane of the saw blade 2 and the lay-on surface 8. Expediently, the actuation section 3 is further designed to bring the saw blade 2 into different positions along a linear movement part, in particular a vertical and/or linear movement path which is pivotable about the aforementioned pivot axis, in order to adjust how far the saw blade 2 projects upwards out of the opening. In this manner, for example the cutting depth of the bench saw 10, 20, 30 can be adjusted.

Hereinafter, the saw blade cover 40 is to be dealt with in detail. The saw blade cover 40 can be provided as part of one of the bench saws 10, 20, 30 which are described here, and/or be provided on its own. Expediently, the saw blade cover 40 already on its own represents an embodiment.

Figure 1:
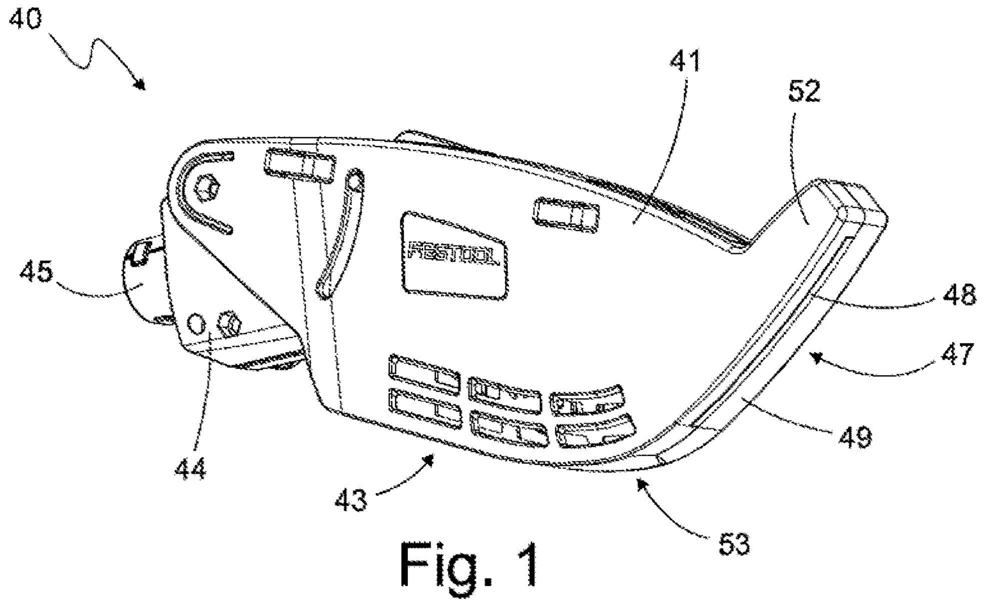
FIG. 1 a saw blade cover.

The saw blade cover 40 is shown on its own in FIG. 1. In the FIGS. 2 and 6, the saw blade cover 40 is shown in a state in which it is fastened to the bench saw 10, 20, 30.

The saw blade cover 40 in particular is designed as a saw blade hood and comprises a cover body 41 which extends in a longitudinal direction (of the saw blade cover 40) and which is manufactured of a first material, for the at least partial covering of the saw blade 2 of the bench saw 10, 20, 30. The saw blade cover 40 further comprises a contact region 47 which is arranged on the cover body 41 at the face side. The contact region 47 is bevelled relative to the longitudinal direction of the saw blade cover 40, so that a deflection of the cover body 41 can be effected by the contact of the contact region 47 with workpiece 11 which moves towards the saw blade 2. The contact region 47 comprises a sliding section 48 which is manufactured of a second material and along which the workpiece 11 can slide on contact with the contact region 47.

The sliding section 48 is provided for preventing the workpiece 11 from cutting into the contact region 47 on contact with this and from snagging on the contact region 47.

The second material differs from the first material. Expediently, the second material has a greater hardness than the first material. The first material in particular is plastic and/or the second material in particular is metal, preferably aluminium.

The saw blade cover 40, in particular the cover body 41 is preferably designed in an elongate and in particular flat or plate-like manner. By way of example, the cover body 41 is designed in a sword-like manner. In a designated alignment, the sides of the cover body 41 which are largest in surface area—in particular the longitudinal sides—are aligned normally to the horizontal direction, in particular normally to the y-direction, as is shown in FIGS. 2 and 6.

An opening 43, in particular a slot, into which the saw blade 2 can be at least partly received is present on the lower side of the cover body 41. The saw blade 2 in the state, in which it is at least partly located in the opening 43, is covered by way of example by the longitudinal sides, the upper side and/or the front face side of the cover body 41.

The saw blade cover 40 comprises a connection section 44 which by way of example comprises a suction connection 45. A suction tube (not shown in the figures) can be connected onto the suction connection 45, in order to vacuum dust particles, which arise on sawing the workpiece 11. The connection section 44 comprises a mechanical interface for fastening the saw blade cover 40 to a fastening section 46 of the bench saw 10, 20, 30, in particular to the riving knife 9. The riving knife 9 by way of example is arranged behind the saw blade 2 in the x-direction. The riving knife 9 by way of example projects out of the opening of the lay-on surface 8. Expediently, the cover body 41 is pivotably mounted on the connection section 44 about a horizontal axis, in particular an axis which runs in the y-direction. The connection section 44 is arranged on the rear face side of the saw blade cover 40 in the longitudinal direction of the saw blade cover 40. In the state in which it is fastened to the fastening section 46, thus given a designated installation of the saw blade cover 40 on the bench saw 10, 20, 30, the saw blade cover 40 is expediently aligned with its longitudinal direction parallel to the x-direction.

The contact region 47 which has already been mentioned above is arranged on the front face side of the saw blade cover 40 in the longitudinal direction of the saw blade cover 40. Expediently, the contact region 47 represents the front face side of the saw blade cover 40, in particular the front face side of the cover body 41.

The contact region 47 is bevelled with respect to the longitudinal detection of the saw blade cover 40. As is to be seen in FIGS. 2 and 6, the contact region 47 (in the installed state of the saw blade cover 40) is bevelled, thus aligned in an inclined manner, with respect to the x-direction and with respect to the lay-on surface 8. In particular, the contact region 47 is aligned normally to an x-z direction. In an x-z section, the contact region 47 coming from the bottom runs obliquely upwards to the right, in the direction away from the saw blade 2.

The cover body 41 expediently comprises a contact location 53 which in the installed state of the saw blade cover 40 preferably forms the deepest point of the saw blade cover 40 and/or lies on the lay-on surface 8 (inasmuch as the cover body 41 is not deflected, in particular lifted, by way of impingement with the workpiece 11).

The contact region 47 is expediently arcuate in an x-z section, in particular in a parabola-shaped manner. The contact region 47 is bevelled in a manner such that when the workpiece 11 which is located on the lay-on surface and which moves in the x-direction in the direction to the saw blade 2 hits the contact region 47, a force component (in particular a force component upwards) is provided, which effects a deflection, in particular a pivoting, of the cover body 41 relative to the saw blade 2, to the lay-on surface 8 and/or to the connection section 44, in particular a deflection and/or a pivoting upwards.

By way of the workpiece 11 being pressed by the user against the contact region 47, the cover body 41 can be changed in its position, so that the cover body 41 releases the path to the saw blade 2 and/or the cutting region of the saw blade 2. Expediently, the cover body 41 herein lifts with its contact location 53 from the lay-on surface 8.

During the movement of the workpiece 11 to the saw blade 2, the workpiece 11 for a part of the path remains in contact with the contact region 47 and herein slides along the sliding section 48. The cover body 41 is herein pressed further and further upwards by way of the contact of the workpiece 11 with the contact region 47.

Before the contact of the workpiece 11 with the contact region 47, the cover body 41 is expediently situated in a covering position, in which the cover body 41 at least partly covers the saw blade 2 and the contact location 53 expediently lies on the lay-on surface 8. If the contact region 47 is impinged by the workpiece 11 which moves in the direction of the saw blade 2, then the cover body 41 is deflected further and further until it is situated in the uncovering position, in which the saw blade 2 is uncovered to a greater extent than in the covering position. Expediently, in the uncovering position the cover body 41 is deflected to such an extent that the workpiece 11 can be fed to the cutting region of the saw blade 2 and can be machined by the saw blade 2.

The sliding section 48 is expediently designed in a strip-like, in particular tape-like manner. The sliding section 48 is preferably designed as a metal tape, in particular as an aluminium tape. Alternatively, the sliding section 48 can also be manufactured from another hard material which is expediently harder than the first material of the cover body 41. The sliding section 48, in particular the aluminium tape is recessed into the contact region 47, in particular contact surface and/or is placed, in particular bonded onto this.

The contact region 47 and the sliding section 48 are preferably designed in an elongate manner. Expediently, the sliding section 48 runs in the longitudinal direction of the contact region 47. The longitudinal direction of the contact region 47 and/or of the sliding section 48 expediently runs diagonally upwards relative to the lay-on surface 8, in particular in a direction away from the saw blade 2. The contact region 47 is expediently a face-side contact surface, in particular of the cover body 11.

The sliding section 48 is expediently only present in a part-region, in particular in a part region which is central in the horizontal direction, in particular in the y-direction, of the face side contact surface. Expediently, surface sections 49, at which the sliding section 48 is not present, result laterally of the sliding section 48 in the y-direction. These surface sections 49 are expediently manufactured of the first material and by way of example assume more than half the y-extension of the contact surface, so that the sliding section 48 expediently assumes less than half the y-extension.

According to an alternative design, the complete contact region, in particular the complete contact surface is manufactured of the second material, so that the complete contact region represents the sliding section.

The sliding section 48 expediently extends over more than half the longitudinal extension of the contact region 47. By way of example, the cover body 41 comprises a projection 52 which projects obliquely upwards and which is arranged in the region of the front face side of the cover body 41, and provides a part of the contact region 47. The sliding section 48 expediently extends into the part of the contact region 47 which is provided by the projection 52.

The sliding section 48 can also be denoted as a reinforcement of the end face of the saw blade cover. The saw blade cover can also be denoted as a protective device. The sliding section 48 is expediently a strip of a hard material, which is fastened to the protective device such that the end-face—in particular the contact region 47—of the protective device can slide with the strip on a contact edge of a cut material of a workpiece which is to be machined. The sliding section 48—by way of example the hard material strip—protects the end face of the protective device from jamming (digging/notching in) on the sharp contact edge of the cut material which on leading the cut material slides over the hard material strip into the cut.

Alternatively or additionally, as an embodiment, a saw blade cover is further provided, whose cover body as a whole is manufactured of metal, in particular aluminium. This saw blade cover is expediently designed as explained above, with the exception of the aspect that the sliding section is not manufactured of a second material but of the same material as the remaining cover body.

The invention further relates to a stop unit 50, in particular to an angle stop, for guiding and/or for the feed of a workpiece 11 to a saw blade 2 of a bench saw.

Figure 3:
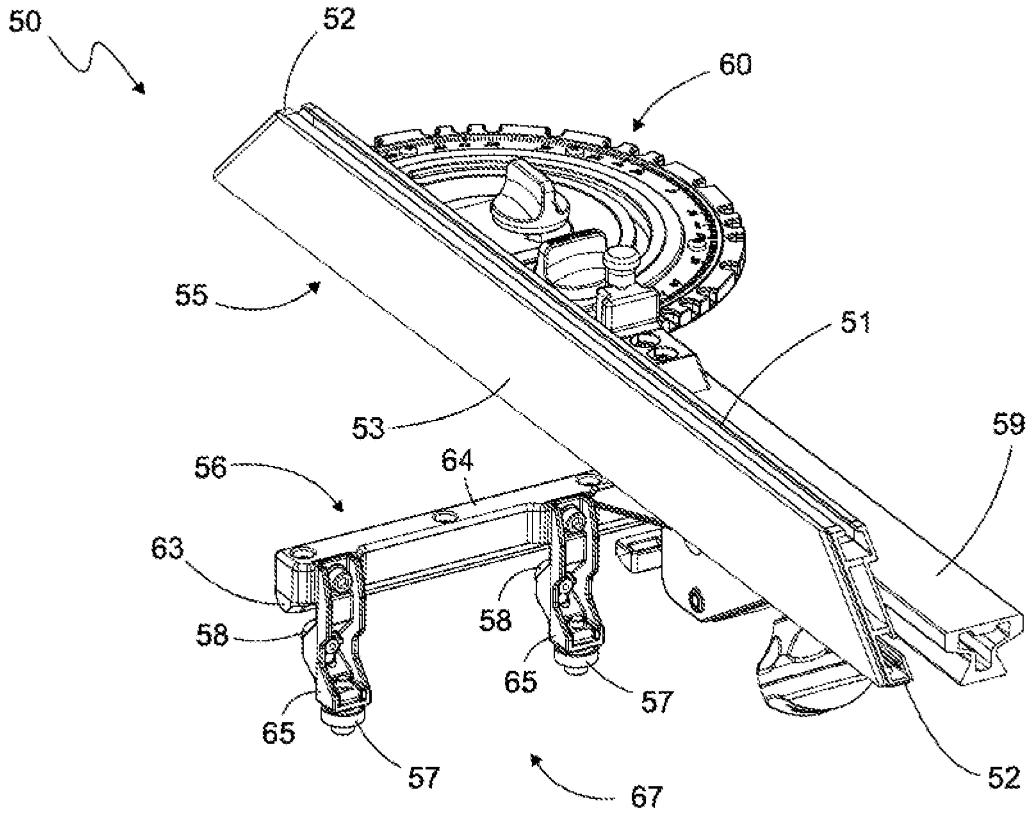
FIG. 3 a stop unit.
Figure 4:
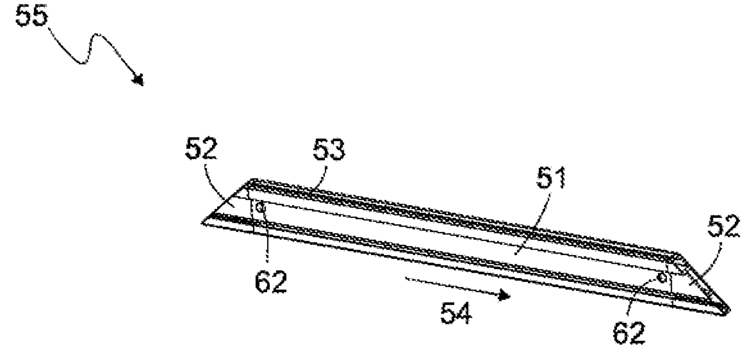
FIG. 4 a stop arm of the stop unit.

The stop unit 50 on its own provides an embodiment and is shown on its own in FIG. 3. The stop unit 50 can also be provided as part of a bench saw. FIG. 6 shows a corresponding bench saw 20 which comprises a stop unit 50.

The stop unit 50 comprises a stop arm 55 for the bearing contact of the workpiece 11, said stop arm extending in a longitudinal direction 54. In FIG. 6, the stop arm 55 is aligned with its longitudinal direction by way of example in the y-direction.

The stop arm 55 comprises a main section 51 which is manufactured of a first material and which extends over more than half the longitudinal extension of the stop arm 55. The feature "first material" which is mentioned here is a different material than the feature "first material" which is mentioned above with reference to the saw blade cover 40. The "first material" which is mentioned here with reference to the stop unit 50 can also be denoted as a "third material" or as a "main section material" for the purpose of a better differentiation.

The stop arm 55 further comprises at least one second end section 52 which is arranged at an end of the main section 51 which is situated in the longitudinal direction 54. By way of example, the stop arm 55 on both ends which are located in the longitudinal direction each comprises a second end section 52, so that the stop arm comprises two end sections 52.

The second end section 52, given the feed of a workpiece 11 towards the saw blade 2, can come into contact with the saw blade 2. In particular, the stop unit 50 in a state, in which it is mounted on the support structure 12 of the bench saw 20, can be brought into a position, in which the end section 52 comes into contact with the saw blade 2, in particular with the cutting region of the saw blade 2. The at least one end section 52 is manufactured of a second material which differs from the first material.

The feature "second material" which is mentioned here is a different material than the feature "second material" which is mentioned above with reference to the saw blade cover 40. The "second material" which is mentioned here with reference to the stop unit 50 can also be denoted as a "fourth material" or as an "end section material" for the purpose of an improved differentiation.

The second material differs from the first material. In particular, the second material has a different conductivity than the first material, expediently a lower conductivity. By way of example, the first material is metal and/or the second material is plastic.

In particular, the second material has another, preferably lower electrical conductivity than the human body.

By way of providing the end section 52 of the second material, one can prevent the aforementioned safety function of the bench saw 20 being activated (inasmuch as it is present), given contact of the end section 52 with the saw blade 2. The bench saw 20 is expediently designed to carry out the safety function, in particular for stopping the saw blade 2 and/or for bringing the saw blade 2 into a safety position, on the basis of an electrical characteristic, in particular an electrical conductivity, of an object which is in contact with the saw blade 2. The electrical characteristic, in particular the electrical conductivity of the second material is preferably such that the bench saw 20 does not carry out the safety function given the contact of the saw blade with the end section 52.

The electrical characteristic, in particular the electrical conductivity of the first material is such that the bench saw 20 carries out the safety function given a contact of the saw blade with the first material.

The stop arm 55 is expediently designed in a strip-like manner and can also be denoted as a guide strip. The stop arm 55 is aligned with its side which is largest with regard to surface area—it longitudinal side—normally to a horizontal direction, expediently orthogonally to the lay-on surface 8. The main section 51 of the stop arm 55 expediently extends over more than 70% of the longitudinal extension of the stop arm 55. The main section 51 is designed in a strip-like manner and is aligned with its side which is largest with regard to surface area orthogonally to the lay-on surface 8. The longitudinal sides of the main section 51 by way of example are rectangular. The main section 51 is expediently an extrusion profile and in particular is manufactured of metal.

An end section 52 connects onto both ends of the main section 51 in the longitudinal direction. Each end section expediently assumes less that 20% of the longitudinal extension of the stop arm 55. Each end section 52 expediently continues the transverse-side outer contour of the main section 51 in the longitudinal direction, so that the stop arm 55 as a whole results in a strip-like body with a constant thickness. Each end section 52 expediently has the same thickness as the main section 51. Expediently, the face side of each end section 52 which is located in the longitudinal direction of the stop arm 55 is bevelled. Each end section 52 is aligned with its side which is largest with respect to surface area—the longitudinal side—normally to the lay-on surface 8. The longitudinal side of each end section 52 by way of example is triangular due to the bevelling at the respective face side.

Each end section 52 is expediently removably attached to the main section 51. By way of example, each end section 51 is stuck into and/or onto a face side of the main section 52. Expediently, each end section 52 is designed as a plastic cap. Each end section 52 is expediently fastened to the main section 51 via a latching connection. By way of example, each end section 51 comprises a latching element 62 which engages into a corresponding latching opening of the main section 51.

Each end section 52 can be expediently removed from the main section 51 and be replaced by a new, identically designed end section 52. Expediently, each end section 52 is a wearing part. In particular, a tool-free and/or destruction-free attachment and/or removal of each end section 52 onto and from the main section 51 is possible.

The stop arm 55 expediently further comprises a cover layer 53 which is arranged on a longitudinal side of the stop arm 55. The cover layer 53 in particular is arranged on that longitudinal side of the stop arm 55, on which the workpiece 11 bears given designated use of the stop unit 50. Expediently, the cover layer 53 covers the complete longitudinal side of the stop arm 55. The cover layer 55 can be expediently manufactured of a material which on contact with the saw blade 2 does not activate the aforementioned safety function, thus in particular has a lower electrical conductivity than the human body and/or the main section 51.

The stop unit 55 further comprises a bearing section 67 with which the stop unit 55 can be movably mounted on the support structure 12 of the bench saw 20. The bearing section 67 comprises a roller section 56, on which several rollers 57, 58 are arranged, via which rollers the bearing section 67 can be movably mounted on the support structure 12.

The roller section 56 by way of example comprises a horizontal section 64 which extends in the horizontal direction and on which several, by way of example two vertically extending vertical sections 65 are arranged.

Several rollers 57, 58, by way of example two rollers per vertical section 65 are arranged on each vertical section 65. Expediently, two of the rollers 57, 58 are aligned to one another in different spatial directions, in particular orthogonally to one another. By way of example, each vertical section 65 comprises two rollers 57, 58 which are aligned in different spatial directions—by way of example a horizontal roller 57, whose roller plane is aligned parallel to a horizontal plane, and a vertical roller 58 whose roller plane is aligned parallel to a vertical plane.

The roller section 56 expediently further comprises a groove nut 63. The groove nut 63 in particular is designed in an elongate manner and is expediently arranged on the lower side of the horizontal section 64.

The stop arm 55 is expediently pivotably mounted relative to the bearing section 67 about a vertical pivot axis via a pivot bearing 60. The pivot bearing 60 by way of example comprises an angle scale. The stop arm 55 is further expediently mounted in a linearly movable manner relative to the bearing section 67 via a linear bearing. By way of example, the stop unit 50 comprises a connection section 59 which by way of example is elongate and which preferably extends in a horizontal direction, in particular in a direction which is aligned orthogonally to the longitudinal direction of the horizontal section 64. Expediently, the stop arm 55 is pivotably mounted on the connection section 59 via the pivot bearing 60 and the connection section 59 is linearly movably mounted, in particular in the longitudinal direction of the connection section 59, on the bearing section 67 via the linear bearing. Expediently, one or more operating elements are present, in order to block and/or release the linear bearing, the pivot bearing 60 and/or the mounting of the bearing section 67 on the support structure.

Figure 5:
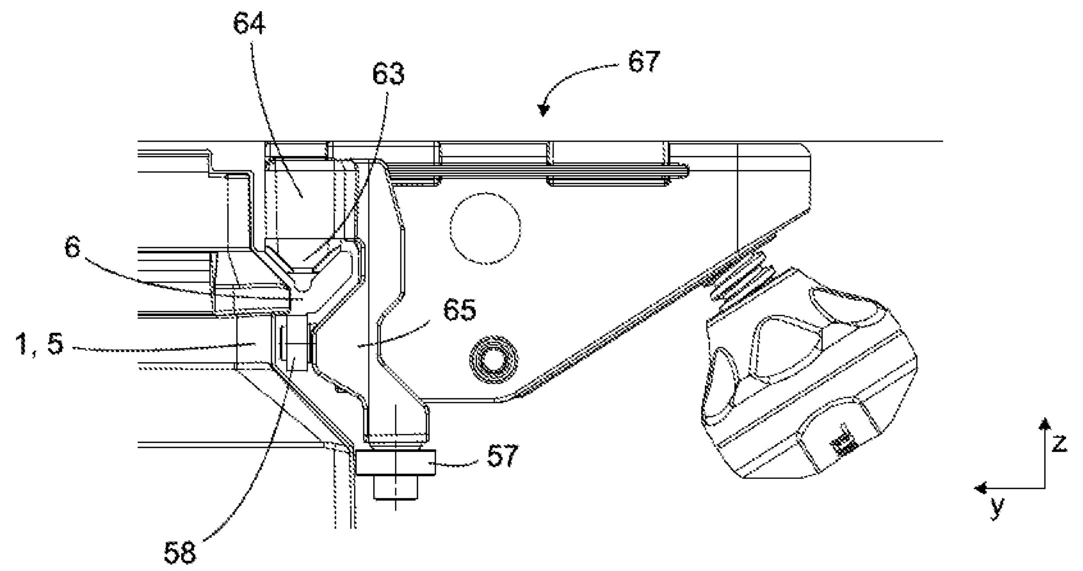
FIG. 5 a bearing section of the stop unit which is movably mounted on a support structure of a bench saw, FIG. 6 a bench saw with the stop unit, FIG. 7 an actuation section which is located on a lay-on section lower side of a bench saw, in a first position, FIG. 8 the actuation section in a second position, FIG. 9 an unequipped accessory fastening structure, FIG. 10 an equipped accessory fastening structure, FIG. 11 an unequipped suction plate, FIG. 12 an equipped suction plate.

The mounting of the stop unit 55 on the support structure 12 is shown by way of example in the FIGS. 5 and 6.

In particular, the support structure 12 of the bench saw 20 comprises one or more guide elements 6, on which the bearing section 67 is mounted or can be mounted. By way of example, each guide element 6 is arranged on the respective peripheral wall 5 of the support structure 12, in particular of the lay-on section 1. Each peripheral wall is aligned normally to a horizontal direction. Each guide element 6 is expediently designed as a rail element which runs in the horizontal direction. By way of example, each guide element 6 provides a groove, in particular a V-groove, which runs in the horizontal direction and into which the aforementioned groove nut 63 is inserted on mounting the bearing section 67 on the support structure 12.

Each guide element 6 is expediently arranged offset to the bottom in the z-direction relative to the lay-on surface 8. Each guide element 6 provides a respective linear guide path for the bearing section 67. The bearing section 67 can be removed from a guide element 6 and be attached onto another guide element 6, for example on another peripheral wall 5.

In FIG. 6, the stop unit 50 is mounted with its bearing section 67 by way of example on a peripheral wall 5 which is aligned normally to the y-direction. The stop unit 50 can be moved in a linearly movable manner in the x-direction along the guide element 6 which is located on this peripheral wall 5. Herein, the stop arm 55 is located at least partly on or above the lay-on surface 8 and can be positioned in its x-coordinate, in particular relative to the lay-on section 1 and/or to the saw blade 2, by way of the linear movement of the stop unit 50.

The stop unit 50 can be removed from the peripheral wall 5 which is aligned normally to the y-direction, and be attached to a peripheral wall 5 which is aligned normally to the x-direction. There, the stop unit 50 can then be moved in the y-direction, in order to position the stop arm 55 in its y-coordinate.

FIG. 6 shows a detailed view of the mounting of the bearing section 67 on the peripheral wall 5 and on the guide element 6 of the support structure 12. The bearing section 67 is engaged with the guide element 6. By way of example, the groove nut 63 is inserted into the groove which is provided by the guide element 6. The vertical rollers 58 bear on the guide element 6 from below. The horizontal rollers 57 bear on the peripheral wall 5.

The guiding of the stop unit 50 is therefore effected in a V-groove which is not (as is conventionally common) arranged in the bench plate—by way of example in the lay-on surface 8—but instead on the peripheral wall 5. Furthermore, the guidance is effected by way of rollers on the V-groove. Additionally, there are expediently lateral rollers—the horizontal rollers—which counteract a tilting. The rollers are rotatably mounted on the bearing section which can also be denoted as the angle stop frame. The guide arm is attached (by way of example via the connection section) to the frame of the angle stop and lies on the lay-on section which can also be denoted as the saw bench. The guide arm guides the workpiece to be machined. The guide arm is preferably adjustable at an arbitrary angle with respect to the cutting plane in the range of +/−90°. At this angle, it is possible to fasten it to the angle stop frame and to guide and/or push the material into the cutting region of the saw blade at this angle. The rotation angle of the guide arm can be read off at the angle scale which is part of the angle stop.

The guide arm (which can also be denoted as a guide strip) comprises protective caps which are stuck on at the ends and which on sawing in prevent an activation of the safety function, in particular an active injury mitigation, AIM function. The AIM function can also be denoted as an active injury reduction function.

A bench saw 30 which provides a further embodiment is hereinafter explained with reference to FIGS. 2, 7 and 8. The bench saw 30 is expediently designed as one of the aforementioned bench saws.

The bench saw 30 comprises the support structure 12 with the lay-on section 1 which provides the lay-on surface 8 for laying on the workpiece 11, as well as the saw blade 2 which engages through the opening of the lay-on section 1, so that at least a part of the saw blade 2 is situated below the lay-on section lower side 14. The bench saw 30 further comprises a housing arrangement 80 which is located below the lay-on section lower side 14 and which surrounds the part of the saw blade 2 which is located below the lay-on section lower side 14. The saw blade 2 is pivotable together with the housing arrangement 80 relative to the lay-on section 1 about an angle between a cutting plane of the saw blade 2 and the lay-on surface 8.

The bench saw 30 comprises the cover flap 87 which covers a gap between the housing arrangement 80 and the lay-on section lower side 14, said gap arising on pivoting the housing arrangement 80, in order to thus prevent a user of the bench saw 30 from being able to grip through the gap to the part of the saw blade 2 which is located below the lay-on section lower side 14.

A section of the lay-on section lower side 14 and of an actuation section 3 which is located thereon is shown in the FIGS. 7 and 8. As already explained above, the actuation section 3 serves for pivoting the saw blade about a horizontal pivot axis, in particular a pivot axis which runs in the x-direction. The actuation section 3 comprises a bearing section 81 which is arranged on the support structure 12, in particular on the lay-on section lower side 14, and a pivoting section 82 which is pivotably mounted relative to the bearing section 81 about the mentioned pivot axis. The pivot axis by way of example is defined by a guide section 94 which is present on the bearing section 81, in particular by a guide slot, on which the pivoting section 82 is guided.

FIG. 7 shows the pivoting section 82 in a normal position, in which the pivoting section 82 is not pivoted and is aligned orthogonally to the lay-on section lower side 14.

FIG. 8 shows the pivoting section 82 in a pivot position, in which the pivot section 82 is pivoted and is not aligned orthogonally to the lay-on section lower side 14.

The pivoting section 82 by way of example comprises the housing arrangement 80, the saw blade 2 and expediently the drive unit 86. The drive unit 86 and the saw blade 2 are preferably mounted in a linearly movable manner relative to the housing arrangement 80, in order to adjust how far the saw bade 2 projects out of the opening in the lay-on surface 8.

The housing arrangement 80 by way of example comprises a housing shell 83, whose side which is largest with regard to surface area, hereinafter also denoted as a lateral side 85, is aligned normally to the y-direction in the normal position. The housing shell 83 further comprises an upper side 84 which is aligned orthogonally to the lateral side 85 and which in the normal position of the pivoting section 82 is aligned parallel to the lay-on section lower side 14. The housing shell 83 further comprises a transverse side which is aligned orthogonally to the lateral side 85 and orthogonally to the upper side 84 and which is expediently aligned normally to the x-direction.

The cover flap 87 is expediently manufactured of a rigid material, preferably metal. Expediently, the cover flap 87 is designed as a cover plate. The cover flap 87 by way of example comprises a plate-like cover section 88. The cover flap 87 is designed in an elongate manner and with its longitudinal direction is aligned in the x-direction.

The cover flap 87 by way of example is mounted on the housing arrangement 80, in particular on the transverse side 93, and on the support structure, in particular on the lay-on section lower side 14. By way of example, the cover flap 87 comprises a first fastening section 89 which is expediently designed as a tab, and is pivotably mounted on the housing shell 83, in particular the transverse side 93, via the first fastening section 89. The cover flap 87 further comprises a second fastening section 91, with which the cover flap 87 is expediently mounted on the support structure 87, in particular a guide slot 92, in a linearly movable manner. The second fastening section 91 is expediently an edge region of the cover flap 87. The guide slot 92 is expediently an intermediate space between the lay-on section lower side 14 and a further element of the support structure 12. Alternatively, the second fastening section 91 can also be fixedly fastened to the support structure 12.

By way of example, the cover flap 87 can be brought from a first position into a second position by way of pivoting the pivoting section 82, in particular the housing arrangement 80. In particular, the cover flap 87 is pivoted from the first position into the second position by way of the pivoting section 82 being pivoted from the normal position into the pivoting position. The cover flap 87 in the first position is aligned parallel to the lay-on section lower side 14. Expediently, the cover flap 87 in the first position is arranged at least partly between the upper side 84 and the lay-on section lower side 14. In the second position, the cover flap 87 is aligned in a manner inclined to the lay-on section lower side 14 about a horizontal axis, in particular the x-axis.

Expediently, the cover flap 87 is mounted on the housing arrangement 80 and the support structure 12 in a manner such that the cover flap 87 is pivoted by way of pivoting the housing arrangement 80 in opposite directions to the pivoting movement of the housing arrangement 80.

Expediently, the support structure 12 comprises several stand legs 7, via which the lay-on section 1 is supportable with respect to the base. Free regions, through which a user can grip below the lay-on section lower side 14, are present between the stand legs 7.

A cover device is consequently provided by the housing arrangement 80 and the cover flap 87 and this cover device covers the saw blade 2 such that the user cannot contact the saw blade 2 below the bench. The cover device can also be denoted as a lateral saw blade cover. The saw blade 2 is adjustable in angle and height. The lateral saw blade cover consists of several parts which expediently cover the saw blade in all positions of the adjustable region and prevent the penetration of a finger to the saw blade below the bench.

Figure 9:
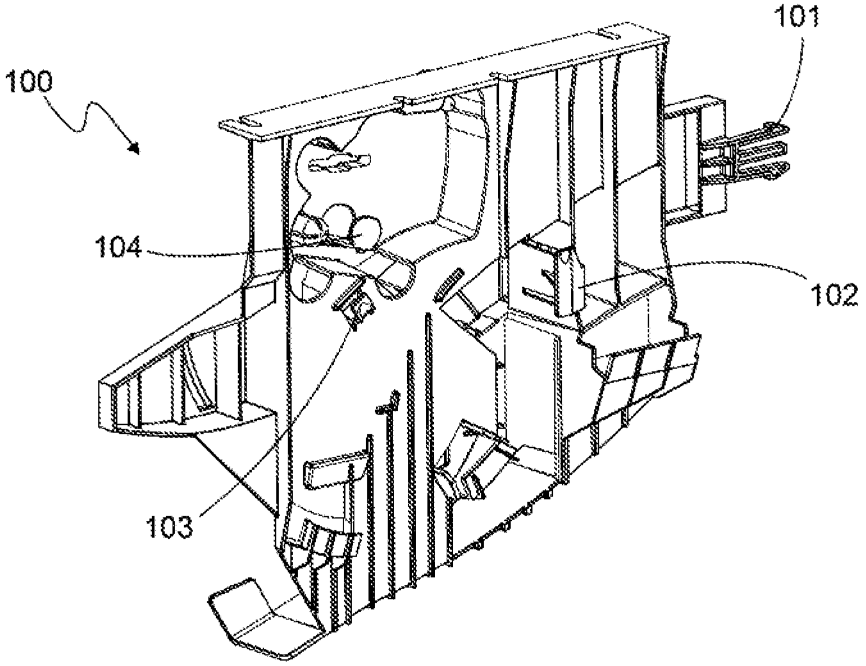
Figure 10:
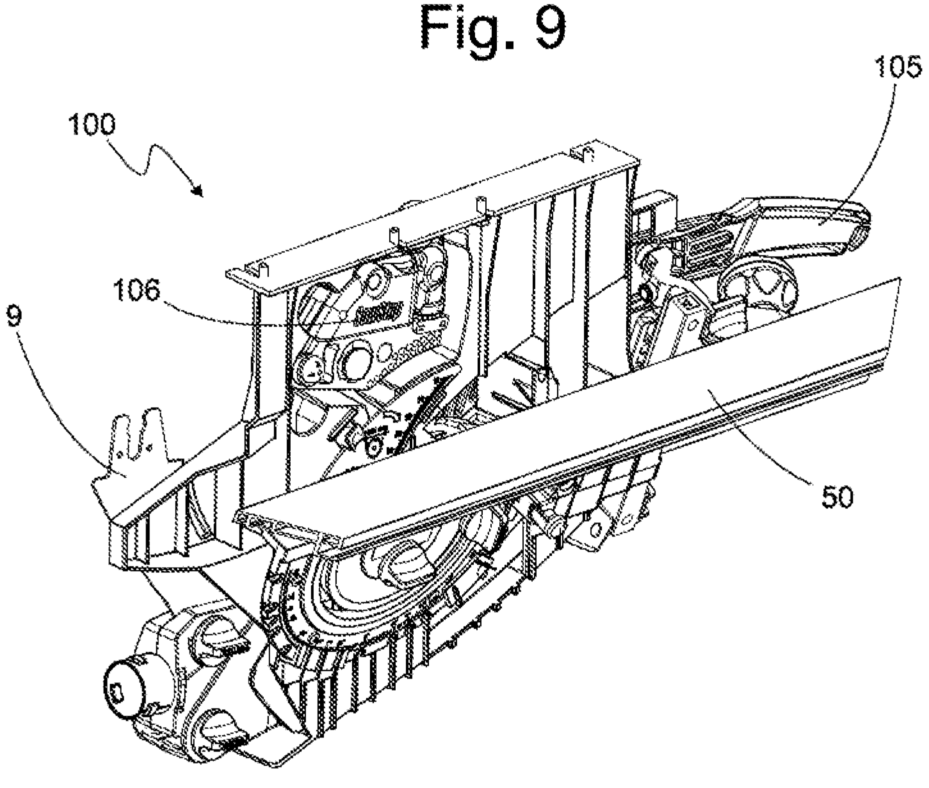

Furthermore, an accessory fastening structure 100 is provided. The accessory fastening structure 100 is not equipped in FIG. 9 and is shown equipped with accessories in FIG. 10. The accessory fastening structure 100 can be provided on its own or as part of a bench saw, in particular one of the bench saws 10, 20, 30 which is described above.

The accessory fastening structure 100 is expediently fastened to the lay-on section lower side 14 and extends vertically downwards from the lay-on section lower side 14. The accessory fastening structure 100 is designed in an essentially plate-like manner and with its plate plane is aligned normally to a horizontal direction, by way of example normally to the y-direction. The accessory fastening structure 100 comprises a plurality of interfaces, on which accessory elements for the bench saw and which in particular are currently not in use can be fastened. The accessory fastening structure 100 in particular serves for storing the accessory elements. The accessory elements in the fastened state are expediently freely accessible from the outside and can preferably be removed from the accessory fastening structure 100 in a tool-free manner.

By way of example, the accessory fastening structure 100 comprises one, more or all of the following interfaces: a first interface 101, in particular comprising a latching hook, for fastening a push stick 105, a second interface 102, comprising in particular a latching hook, for fastening the stop unit 50, a third interface 103, comprising in particular a latching hook, for fastening a riving knife 9, a fourth interface 104, in particular comprising a latching hook, for fastening a workcenter, for example a replacement cartridge, in particular for the safety function and/or a fifth interface for fastening the saw blade cover.

The accessory fastening structure 100 serves preferably for the secure storage of the accessory elements on the bench saw. For this, the mentioned interfaces are integrated on the accessory fastening structure 100. The interfaces expediently comprise fixation elements. The accessory fastening structure 100 preferably permits the user to carry out a simple removal of the push stick 105 from the front side of the bench saw which is aligned normally to the x-direction.

The pocket is fastened to the bench plate by way of a screw and a lateral snap closure is present, in order to reduce the horizontal movement.

Figure 11:
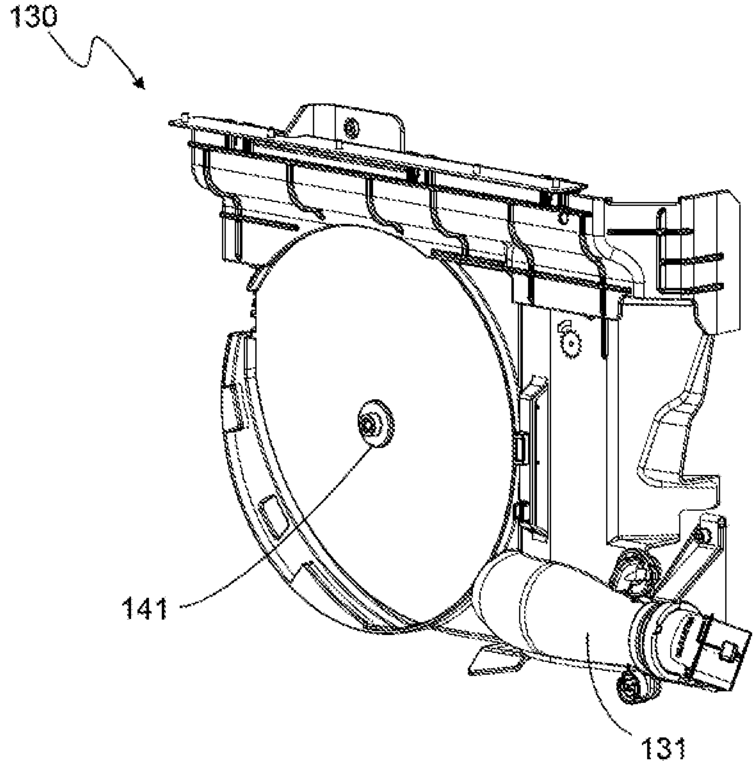
Figure 12:
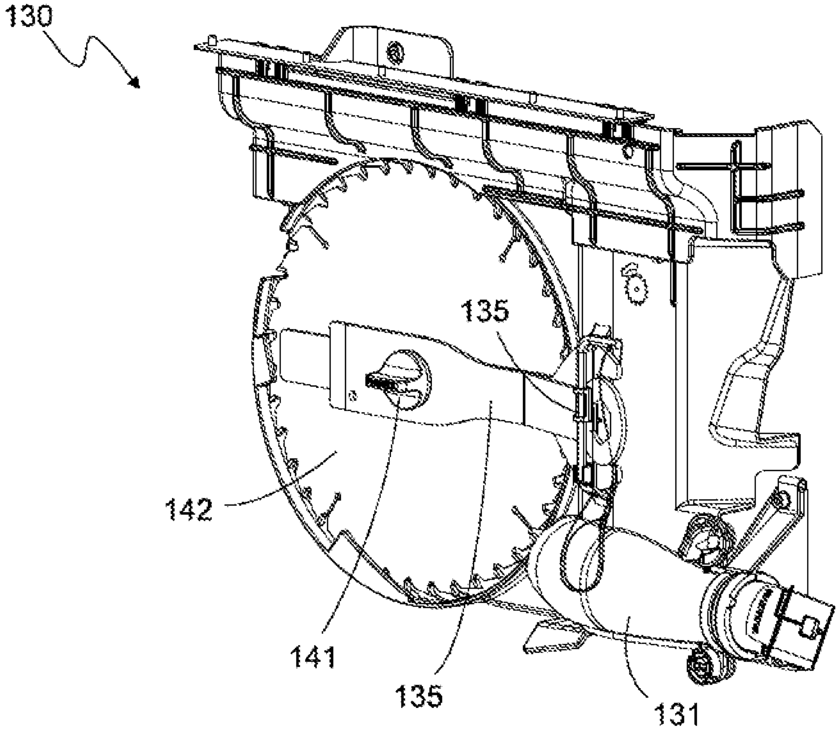

Furthermore, a suction plate 130 is provided. The suction plate 130 is not equipped in FIG. 11 and is shown equipped with accessories in FIG. 12. The suction plate 130 can be provided on its own or as part of a bench saw, in particular one of the aforedescribed bench saws 10, 20, 30. Expediently, the suction plate 130 is arranged below the lay-on section lower side 14 and at least partly surrounds the bench saw 2. The suction plate 130 comprises a suction connection 131, on which a suction tube for sucking dust which is produced on sawing can be fastened.

In an advantageous manner, the suction plate 130 on its side which is away from the saw blade 2 comprises a first interface 141 for a replacement saw blade 142 as well as further interfaces for fastening accessory elements 135, in particular tools for assembling and disassembling the saw blade 2, 142 and the expansion knife and/or riving knife 9. Preferably, at least one accessory element 135 represents a part of the first interface 141.

Concerning the present suction plate, which can also be denoted as a suction hood, the function of the suction plate is expanded to the extent that the suction plate further serves as a replacement blade holder and serves for storing the tools for assembling and disassembling the saw blade and the expansion knife.

The invention claimed is:

1. A bench saw comprising a stop unit, a lay-on section having a lay-on surface for laying a workpiece on top of the lay-on surface, and a saw blade, wherein the stop unit serves for guiding and/or for the feed of a workpiece to the saw blade of the bench saw, the stop unit comprising:

- a stop arm which extends in a longitudinal direction for the contact of the workpiece,
- wherein the stop arm is aligned with its side which is largest with regard to surface area orthogonally to the lay-on surface,
- wherein the stop arm comprises a main section which is manufactured from a first material and which extends over more than half the longitudinal extension of the stop arm, and the stop arm comprises at least one end section which is arranged on an end of the main section which end is located in the longitudinal direction, said end section being able to come into contact with the saw blade given a feed of the workpiece towards the saw blade,
- wherein the at least one end section continues a transverse-side outer contour of the main section in the longitudinal direction, so that the stop arm as a whole results in a strip-shaped body with a constant profile in the longitudinal direction,
- wherein the at least one end section is manufactured from a second material,
- wherein the first material is metal and the second material is plastic,
- wherein the bench saw is configured to carry out a safety function on a basis of an electrical characteristic of an object which is in contact with the saw blade, wherein the electrical characteristic of the second material of the end section is such that the bench saw does not carry out the safety function given a contact of the saw blade with the end section.

2. The bench saw according to claim 1, wherein the second material has a different conductivity than the first material.

3. The bench saw according to claim 1, wherein the at least one end section is attached to the main section in a removable manner.

4. The bench saw according to claim 1, wherein the at least one end section is stuck into and/or onto a face side of the main section.

5. The bench saw according to claim 1, wherein the main section is an extrusion profile and/or the end section a plastic cap.

6. The bench saw according to claim 1, wherein the second material has a lower electrical conductivity than the first material.

7. The bench saw according to claim 1, wherein the second material has a lower electrical conductivity than an electrical conductivity measured in a human body.

8. The bench saw according to claim 1, wherein the stop arm at both ends which are located in the longitudinal direction comprises a respective end section, so that the stop arm comprises two end sections.

9. The bench saw according to claim 8, wherein the at least one end section is designed as a plastic cap.

10. The bench saw according to claim 1, wherein the stop arm further comprises a cover layer which is arranged at a longitudinal side of the stop arm and has a lower electrical conductivity than the human body and/or the main section.

11. The bench saw according to claim 1, further comprising a support structure with the lay-on surface for laying the workpiece on top of the lay-on surface when machining the workpiece with the saw blade, wherein the stop unit further comprises a bearing section which is engaged with a guide element of the bench saw, in order to thus provide a movable mounting of the stop unit relative to the support structure along the guide element, wherein the guide element is arranged offset to the bottom relative to the lay-on surface, wherein the guide element is arranged outside of a horizontal area defined by the lay-on surface.

12. The bench saw according to claim 11, wherein the bearing section comprises rollers, via which the bearing section is movably mounted relative to the support section, wherein at least two of the rollers are aligned to one another in different spatial directions.

13. The bench saw according to claim 11, wherein the guide element is designed as a rail element which runs in the horizontal direction and/or the guide element provides a groove which runs in the horizontal direction.

14. The bench saw according to claim 1, wherein the stop unit is an angle stop.

15. The bench saw according to claim 1, wherein the safety function is configured to stop the saw blade and/or to bring the saw blade into a safety position.

16. The bench saw according to claim 1, wherein the electrical characteristic is an electrical conductivity.

17. The bench saw according to claim 1, wherein the stop arm is arranged in such a manner that the at least one end section protrudes at least in part into a cutting plane of the saw blade.

18. The bench saw according to claim 1,

- wherein the at least one end section is less than 20 percent of the longitudinal extension of the stop arm.

19. The bench saw according to claim 1,

- wherein a longitudinal extension of the at least one end section is larger than a thickness of the at least one end section.

* * * * *